H. HENDRICKSON.
BALANCED THROTTLE-VALVE.
No. 181,677. Patented Aug. 29, 1876.
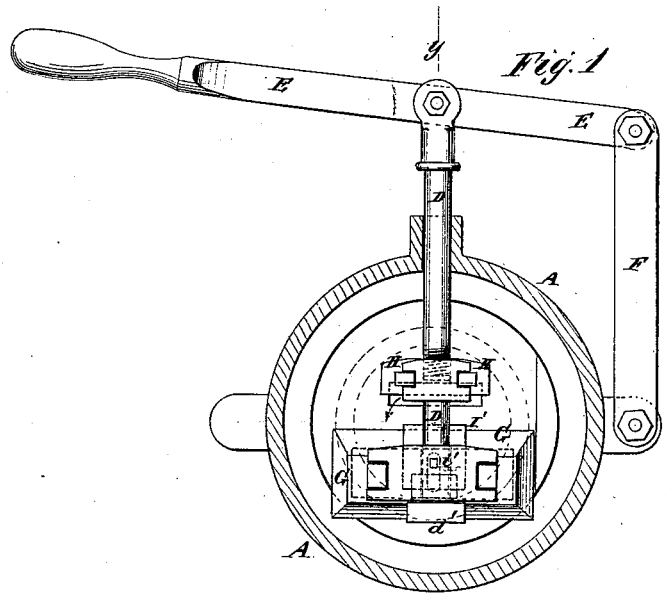
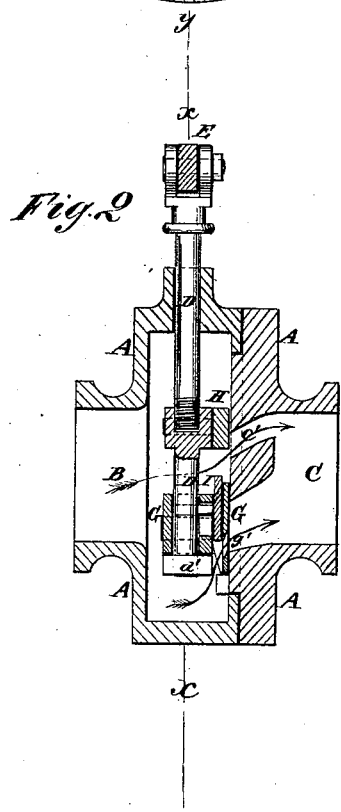
WITNESSES:
INVENTOR:
H. Hendrickson
BY
ATTORNEYS.

UNITED STATES PATENT OFFICE.

HUBBARD HENDRICKSON, OF RED BANK, NEW JERSEY.

IMPROVEMENT IN BALANCED THROTTLE-VALVES.

Specification forming part of Letters Patent No. 181,677, dated August 29, 1876; application filed February 21, 1876.

*To all whom it may concern:*

Be it known that I, HUBBARD HENDRICKSON, of Red Bank, in the county of Monmouth and State of New Jersey, have invented a new and useful Improvement in Balanced Throttle-Valve, of which the following is a specification:

Figure 1 is a view of the inlet side of my improved valve, the valve-chest being shown in section through the line $x\ x$ of Fig. 2. Fig. 2 is a section of the same, taken through the line $y\ y$ of Fig. 1.

The object of this invention is to furnish an improved throttle-valve which shall be so constructed that steam may be admitted to balance the valve, keep it in place, and enable it to be opened easily.

The invention will first be described in connection with drawing, and then pointed out in the claim.

A is the valve-chest. B is the inlet, and C is the outlet. D is the valve-stem, which passes in through a stuffing-box in the side of the chest A, and is operated by the lever E, pivoted to its outer end. The end of the lever E is pivoted to the bar F, the other end of which is pivoted to a lug formed upon the valve-chest, or to some other suitable support. The inner end of the valve-stem D passes through the valve G. The movement of the stem D in the valve G is limited by a nut screwed upon its inner end, and by a small valve, H, attached to it. The valve H covers a small outlet-port, $c'$, leading into the main outlet C, as shown in Fig. 2. In the main valve G is formed a small port, which is closed by a small valve, I, placed in a recess in the body of the valve G, and connected with the valve-stem D by a pin, $i'$, passing through a slot in the body of the valve G. Either or both the valves H I may be used, as may be desired.

In opening the valve the movement of the stem D first moves the valves H I, which are small, and are thus easily moved, and admits the steam, which passes to the other side of the main valve G, and equalizes the pressure upon it, so that it can be moved freely.

Another advantage of this construction is that the steam enters upon both ends of the valve, and thus holds it to its seat, and prevents it from jumping, and enables it to be partly opened without being forced farther open by the steam, so that enough steam may be admitted to only start the engine when desired.

I am aware that it is not new to operate the throttle and supplementary valve of a locomotive engine by a single lever; but

What I claim is—

The combination, with valve-chest A, having inlet and outlet B C, of a valve-stem, D, limited in its movement through valve G by a nut, $d'$, and valve H, arranged as shown and described.

HUBBARD HENDRICKSON.

Witnesses:
JAMES T. GRAHAM,
T. B. MOSHER.